Figure 3:
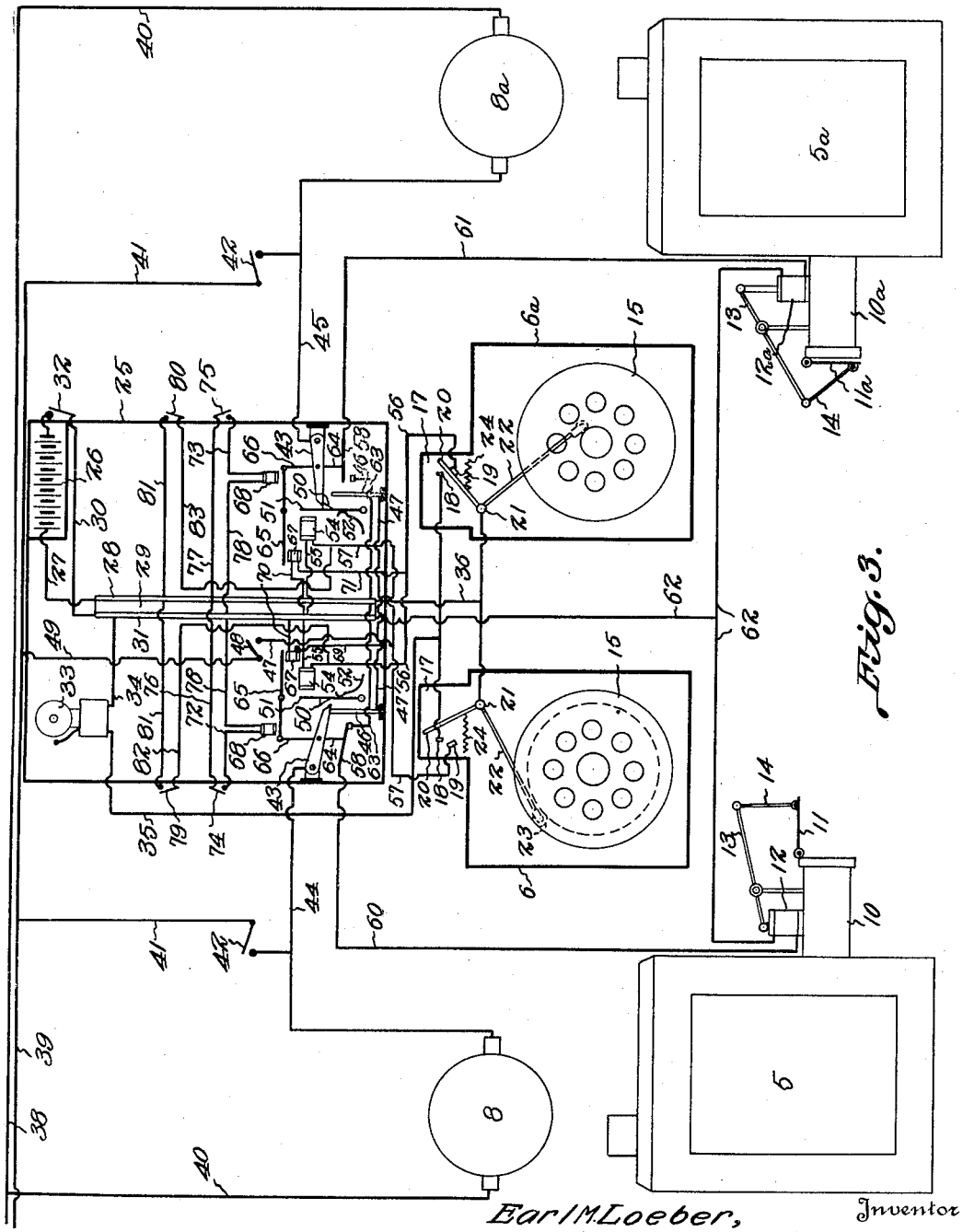

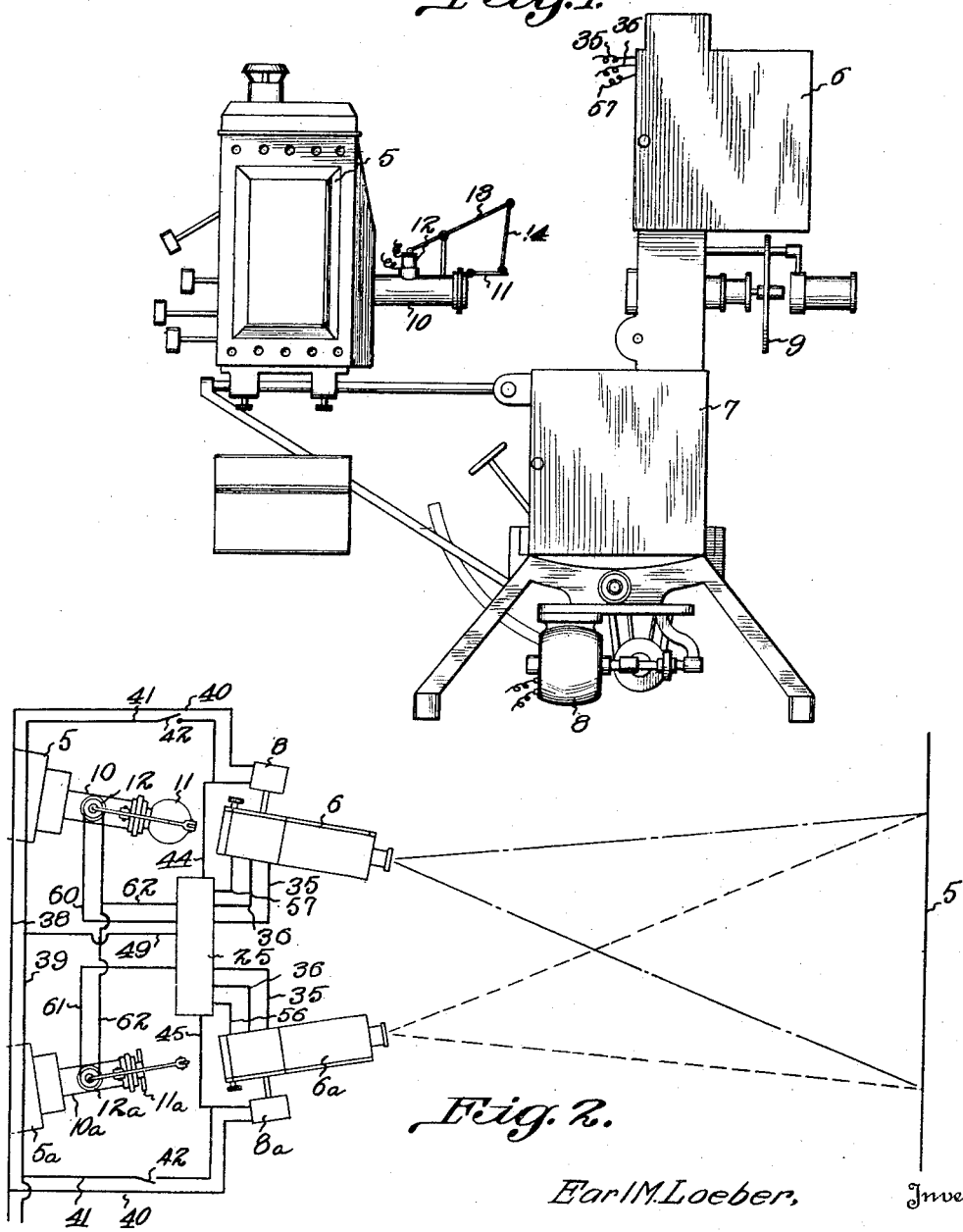

Nov. 30, 1926.  
E. M. LOEBER  
1,609,178  
APPARATUS FOR FACILITATING CONTINUOUS PROJECTION OF MOTION PICTURES  
Filed March 28, 1925    4 Sheets-Sheet 2

Earl M. Loeber, Inventor

Witnesses  
By Richard B. Owen,  
Attorney

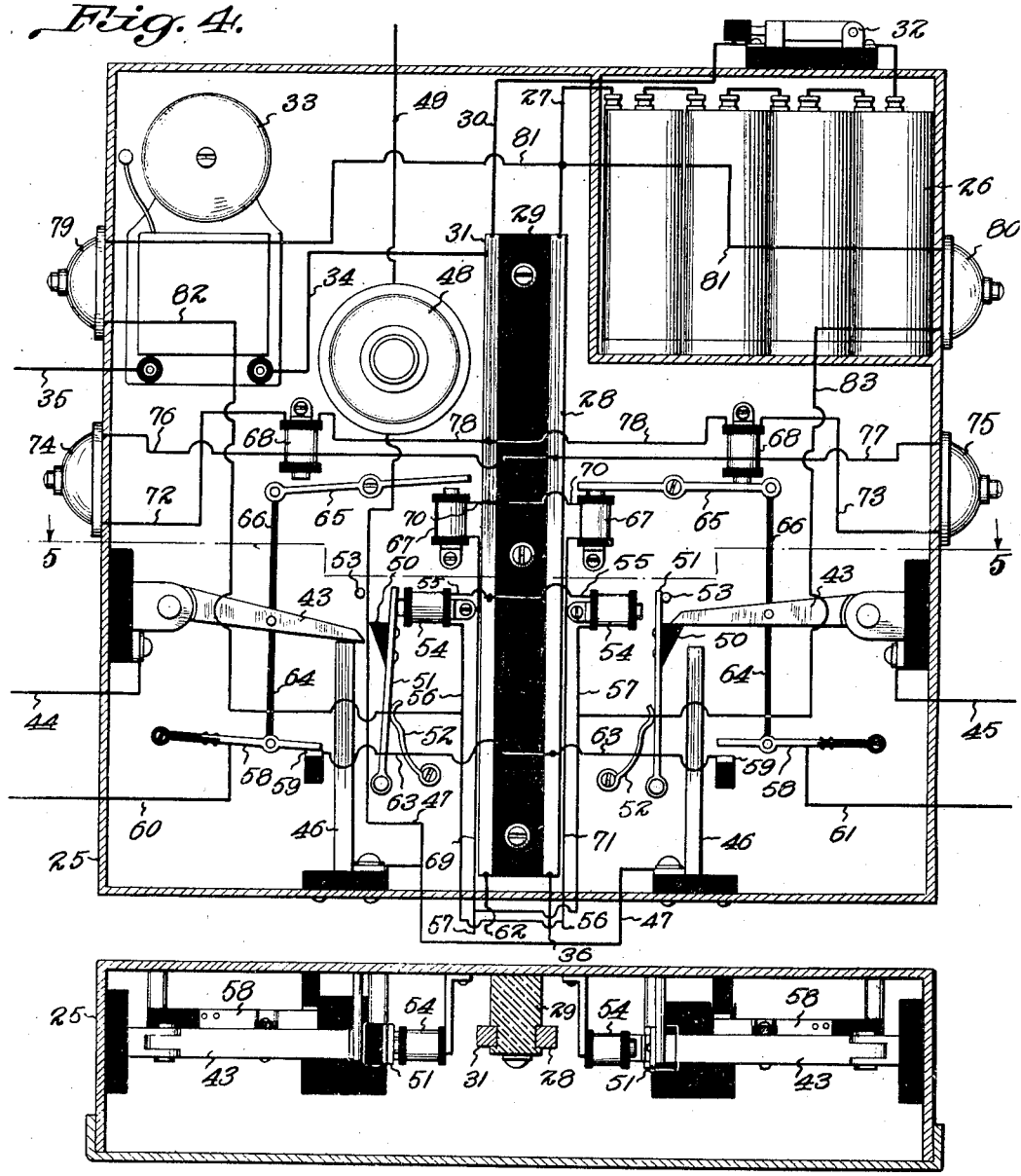

Nov. 30, 1926.

E. M. LOEBER 1,609,178

APPARATUS FOR FACILITATING CONTINUOUS PROJECTION OF MOTION PICTURES

Filed March 28, 1925  4 Sheets-Sheet 4

Earl M. Loeber, Inventor

Witnesses

By Richard B. Owen, Attorney

Patented Nov. 30, 1926.

1,609,178

UNITED STATES PATENT OFFICE.

EARL M. LOEBER, OF LINCOLN, ILLINOIS.

APPARATUS FOR FACILITATING CONTINUOUS PROJECTION OF MOTION PICTURES.

Application filed March 28, 1925. Serial No. 19,057.

This invention relates to an apparatus for facilitating continuous projection of motion pictures, and has more particular reference to an automatic film exhaustion warning and change-over device for motion picture machines.

In motion picture theatres, it is the practice to install two motion picture machines, so that the one or the other, thereof, may be kept in action while the other is being adjusted and a new reel substituted therein. Usually these two machines are placed side by side, some little distance apart, and for alternately cutting off and projecting the light therefrom, cooperating shutters are operatively connected for simultaneous movement, so that when the lens tube of one machine is uncovered, the lens tube of the other machine will be covered and vice versa.

The machines have individual motor actuated mechanisms for feeding and exposing the film, and the starting and stopping of the motors is usually accomplished by the use of manually controlled switches. The starting of one machine and the simultaneous stopping of the other machine immediately upon the exhaustion of the film of said other machine, which is necessary for the desired uninterrupted projection of the picture plays, thus depends upon the fallible alertness, ability and skill of the operator. Under these conditions, the continuity of projection is often faulty, due to stopping of one machine before the other is started, starting of the other machine before the one is stopped, or failure to light the projection lamp of one of the machines before the picture projection of the other machine is completed. Furthermore, the operator is faced with the need of a helper or the necessity of such speed and skill in the performance of his duties that the latter are unnecessarily tedious. In addition to the above, the liability of failing to light the projection lamps in time has been overcome by leaving them lighted or lighting them long before required, resulting in wasteful and expensive use of current, incurring fire risks, and allowing undesirable generation of heat.

The primary object of the present invention is to overcome the above defects and objections by providing simple and reliable automatic means for warning the operator when the film of the machine in use is nearly exhausted and that the projection lamp of the other machine should be lighted and for subsequently simultaneously stopping the operative machine and closing its lens tube shutter, and starting the other machine and opening its lens tube shutter when the film of the operative machine is completely exhausted.

Another object of the invention is to provide automatic means for starting one or the other of two motion picture machines and simultaneously stopping the other machine immediately upon the exhaustion of the film of said other machine, whereby uninterrupted projection of a picture play or picture plays may be had.

Still another object of the invention is to provide an improved means for automatically warning the operator when the film of one or the other of two motion picture machines is nearly exhausted, whereby the operator will have sufficient time to light the projection lamp of the other motion picture machine.

With the above general objects in view, and others that will become apparent as the nature of the invention is better understood, the same consists in the novel form, combination and arrangement of parts hereinafter more fully described, shown in the accompanying drawings and claims.

Figure 6:
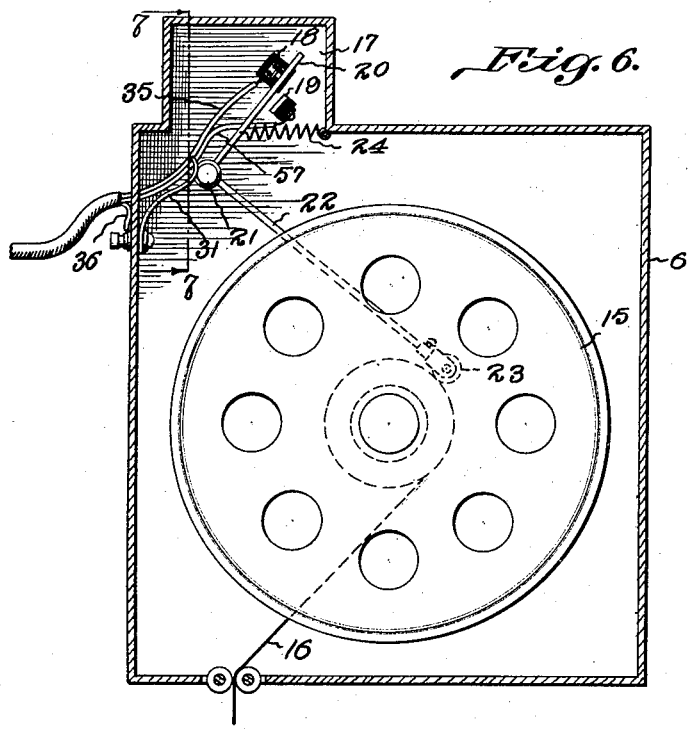
Figure 7:
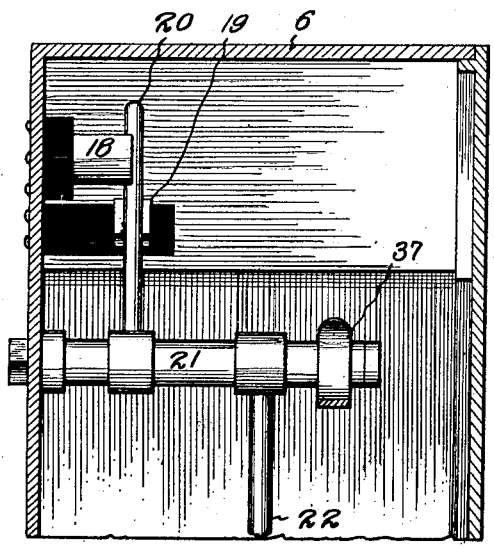
Figure 8:
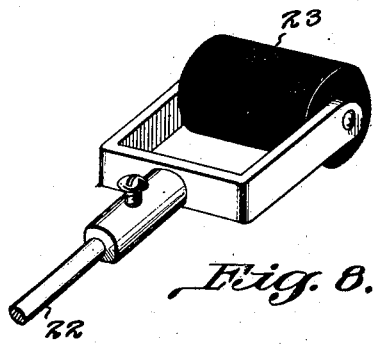

In the drawings, wherein like reference characters indicate corresponding parts throughout the several views, Figure 1 is a side elevational view of a conventional motion picture machine equipped with parts in accordance with the present invention, Figure 2 is a diagrammatic plan view illustrating the relation of the two machines to each other and the screen upon which the pictures are projected, as well as part of the present invention, a portion of the latter of which is illustrated diagrammatically, Figure 3 is a diagrammatic view partly in plan and partly in elevation, illustrating the present invention in operative relation to parts of the two motion picture machines, Figure 4 is a vertical sectional view through a casing containing parts of the present invention, Figure 5 is a horizontal sectional view taken substantially upon line 5—5 of Figure 4, Figure 6 is a vertical sectional view through the upper film magazine of a motion picture machine equipped in accordance with the present invention, Figure 7 is a fragmentary sectional view taken substantially upon line 7—7 of Figure 6 and drawn on a larger scale, and Figure 8 is an enlarged fragmentary perspective view of an end portion of one of the film contacting arms constituting part of the invention.

Referring more in detail to the drawings, the two machines are placed in side by side relation as shown in Figure 2 so as to project pictures within the same area upon the screen 5 in the usual manner, the lamp house and upper film magazine of one machine being respectively indicated at 5 and 6, and the lamp house and upper film magazine of the other machine being respectively indicated at 5ª and 6ª. The two machines are of identical construction, and as is shown with respect to one of the same in Figure 1, each includes an upper film magazine from which the film is fed to a lower film magazine 7 by a suitable well known mechanism having an actuating motor 8 which also actuates a suitable shutter mechanism generally indicated at 9.

The lamp house 5 of one machine has a lens tube 10 to which is hinged a vertically swinging shutter or dowser 11 by means of which the light may be permitted to pass to and through the film as it is fed from one magazine to the other, or whereby the light may be prevented from passing through the film, and a similar shutter 11ª is similarly provided upon the lens tube 10ª of the other machine. In Figure 3 the motor for operating the film feeding mechanism of one machine is indicated at 8, while the motor for the same purpose or which is utilized for the same purpose on the other machine is indicated at 8ª so as to avoid confusion and insure a clear understanding of the invention from the following description.

A solenoid 12 is suitably mounted upon the lens tube 10 of one machine, while a similar solenoid 12ª is mounted upon the lens tube 10ª of the other machine, the core of each of said solenoids being operatively connected to its respective shutter 11 or 11ª by means of a lever 13 and a link 14, whereby when the coil of the solenoid is energized, the coil will be drawn inwardly for opening the attached shutter. In other words, the shutter 11 will be opened upon energizing the solenoid 12 while the shutter 11ª will be opened when the solenoid 12ª is energized. The solenoids 12 and 12ª preferably are equipped with springs for normally projecting their cores so that when said solenoids are not energized, the attached shutters will be normally closed.

The upper film magazine of each machine consists of a casing in which is removably journaled a reel 15 upon which the film 16 is originally wound and from which it is fed to a similar reel similarly mounted in the lower film magazine of such machine.

In accordance with the present invention, and as shown more clearly in Figures 6 and 7, the upper film magazine of each machine is provided with a compartment 17 in which are mounted a pair of contacts 18 and 19 which are arranged in the path of a contact arm 20 rigid with a shaft 21 which is suitably journaled in a horizontal position and upon which is also fixed a depending arm 22 arranged to pass between the flanges of the adjacent film reel and engage the film carried by the latter. The lower contacting end of the arm 22 is preferably equipped with an anti-friction roller 23 of some suitable material such as soft rubber so as to engage the film without scratching or marring the latter, and the arm 22 is maintained in contact with the film by means of a suitable tension spring 24 which is shown in Figure 6 as attached to the film magazine 6 of one machine and to the upper arm or contact arm 20. While the compartment 17 is shown in Figures 6 and 7 as provided by an upwardly projecting part of the upper film magazine 6, it is preferable to provide this compartment 17 by attaching a separate receptacle or box to the upper corner portion of the film magazine, the contacts 18 and 19 being mounted in this separate box together with the contact arm 20, and the shaft 21 being arranged to project through the side of the film magazine and into the latter where it is equipped with the arm 22. This disposes the contacts 18 and 19 and 20 in a separate compartment from that in which the film is disposed so that danger of fire from a spark in minimized. The equipment of standard machines with the present invention is also rendered more simple and practical by reason of this variation in form. However, the essential feature of the invention resides in the arrangement of parts so that when a full reel is disposed in the upper film magazine, the arm 22 will be sufficiently elevated to disengage the contact arm 20 from the adjacent contact 18, whereby, as the film is exhausted from the reel, the arm 22 will lower so as to first engage the contact arm 20 with contact 18 and then engage the contact arm 20 with contact 19. These parts are further so related that the engagement of contact arm 20 with contact 18 takes place immediately prior to the exhaustion of the film from the reel in the adjacent film magazine and the engagement of contact arm 20 with contact 19 takes place simultaneously with or substantially simultaneously with the exhaustion of the film completely from the reel in said adjacent upper film magazine. The contact 18 is preferably in the nature of a yieldable or flexible member so that the contact arm 20 may be caused to pass the same by the action of spring 24.

Suitably mounted in a desirable position within the projection booth is a cabinet or casing 25 which contains certain parts constituting the present invention as shown more clearly in Figures 3, 4 and 5. The casing 25 contains a suitable source of direct current supply such as the plurality of dry cell batteries 26 which are connected in series, and the positive terminal of this source is connected by means of a wire 27 with a conducting strip 28 which is suitably mounted upon a base of insulation indicated at 29, the latter being suitably mounted in the casing 25. The negative terminal of the electrical source of supply, consisting of the batteries 26, is connected by means of a wire 30 with another conducting strip 31 which is also carried by the base 29 and insulated from the conducting strip 28, a manually operable switch 32 being provided for controlling the flow of current from the batteries to the conducting strip 31. An audible signal, such as the electric bell 33, is mounted in the casing 25 and has one terminal thereof connected with the conducting strip 31 by means of a wire 34, while the other terminal of said bell is connected by means of wire 35 with the contact 18 in the compartment 17 of the upper film magazines 6 and 6ª of the two motion picture machines. It will also be seen that the shafts 21 of the two machines are connected by means of a wire 36 with the conducting strip 28 so that the circuit including the batteries 26 and the bell 33 is closed when either of the contact arms 20 engage its respective contact 18, whereby a signal is given when the film is nearly exhausted in either of the upper magazines 6 or 6ª. As shown clearly in Figures 6 and 7, the wire 36 may be placed in operative relation to the shaft 21 by means of a yieldable brush 37 attached to the wire 36 and bearing upon the adjacent shaft 21.

Alternating current is generally used for the operation of the motors 8 and 8ª of the two motion picture machines, and this current is generally obtained by tapping the line wires 38 and 39 of an ordinary city power system, and connecting the feed wires 40 and 41 of these motors to said line wires 38 and 39 as shown clearly in Figure 3, a suitable manually operable switch 42 being interposed in the wire 41 of each motor whereby the current may be used to the exclusion of the present invention in case of necessity for operating the motors, or whereby operation of the motors is prevented except in connection with the present invention.

Pivotally mounted within the casing 25 are a pair of similar contact arms 43, one of which is connected by means of wire 44 with the wire 41 of motor 8, and the other of which is connected by means of wire 45 with the wire 41 of motor 8ª, the wires 44 and 45 being connected to the wires 41 between the switches 42 and the motors 8 or 8ª. A pair of similar stationary contacts 46 are mounted beneath the contact arms 43 so that each of said contact arms 43 cooperate with one of the stationary contacts 46 for closing or breaking a circuit, and these stationary contacts 46 are connected by means of a wire 47 to one terminal of a snap switch 48 which is of the manually operable type and which has its other terminal connected by means of wire 49 with the line wire 39. It is thus apparent that when current is supplied to motor 8 by means of its feed wire 40, and when the switch 42 in the wire 41 of said motor 8 is open, the current is required to flow by way of wire 44 switch arm 43, which is connected to said wire 44, cooperating with contact 46, wire 47, switch 48 and wire 49 to line wire 39. In a like manner, when switch 42 is open in the wire 41 of motor 8ª, the current will be forced to return to the line wire 39 by way of the contact arm 43 which is connected to wire 45, the cooperating contact 46, wire 47, switch 48, and wire 49. The swinging contact arms or movable switch elements 43 are normally held elevated in circuit breaking position by means of supporting lugs 50 provided on the upper ends of pivoted catches 51, one of which is associated with each switch arm 43 as best shown in Figures 3 and 4, and these catches 51 are normally urged toward the switch arms 43 so as to position their lugs in the path of the free ends of the arms 43, by means of springs 52. The catches 51 are limited in their swinging movement toward the arms 43, such as by means of stop pins 53 so that said catches 51 will be properly positioned by their springs 52 for disposing the lugs 50 of said catches in position to support the arms 43 when the latter are elevated and disengaged from the stationary contacts 46.

An electromagnet 54 is suitably mounted at the outer side of each of the catches 51 adjacent the free upper end of the latter, and each electromagnet 54 has one side of its coil connected by means of a wire 55 with the conducting strip 31. The electromagnet 54 which is associated with the catch 51 that is arranged to cooperate with the switch arm 43 connected with wire 44 of motor 8, has its other side connected to contact 19 of the upper film magazine 6ª carried by the motion picture machine having the motor 8ª, by means of a wire 56, while the other electromagnet 54 is connected by means of wire 57 with the contact 19 in the upper film magazine 6 of the machine which is provided with the motor 8. It will thus be seen that when contact arm 20 engages contact 19 of the machine having the upper film magazine 6, current is allowed to flow from the battery cells 26 to conducting strip 31 by way of wire 30, then by way of wire 55 to the electromagnet 54 which is associated with the catch 51 cooperating with switch arm 43 that is connected to wire 45. The current will flow from the electromagnet 54 by way of wire 56 to contact 19 of the magazine 6 then through the cooperating arm 20 to its shaft 21, and finally by way of wire 36 to the conducting strip 28 and return wire 27 of the battery cells 26. The catch 51 associated with said switch arm 43 which is connected to wire 45, is thus attracted by the adjacent electromagnet 54 so as to withdraw the lug of said catch from beneath the free end of said switch arm 43 and allowing the latter to lower to engage the adjacent stationary contact 46, whereby the circuit to motor 8$^a$ of one motion picture machine is closed. Thus, upon the exhaustion of the film in the film magazine 6 of one machine the motor 8$^a$ of the other machine will be started. In a like manner, when the film is exhausted in the magazine 6$^a$, the contact arm 20 of the latter will engage the contact 19 associated therewith for closing a circuit including the electromagnet 54 which attracts the catch 51 operatively associated with the switch arm 43 to which wire 44 is connected. By reason of this fact the switch arm 43 associated with wire 44 is allowed to lower and engage its cooperating contact 46 for completing the circuit of the motor 8 when the film has become exhausted in the upper film magazine 6$^a$ of the other machine, thereby affecting starting of the machine having the motor 8.

Pivotally mounted beneath each of the switch arms 43 is a further swinging switch arm 58 cooperating with a stationary contact 59. The switch arm 58 which is disposed beneath the switch arm 43 to which wire 44 is connected, is connected by means of wire 60 with the solenoid 12 on the lamp house 5, and the switch arm 58 which is disposed beneath the switch arm 43 to which wire 45 is connected, is connected by means of wire 61 with the solenoid 12$^a$ of lamp house 5$^a$. The other sides of the solenoids 12 and 12$^a$ are connected by means of wire 62 with the conducting strip 31, and the two stationary contacts 59 are connected by means of wires 63 with the conducting strip 28. It will thus be seen that when the circuit of motor 8 is broken by elevation of its controlling switch arm 43, the circuit of the solenoid 12 will also be broken by reason of a link connection 64 between the switch arm 43 which controls the circuit of motor 8 and the switch arm 58 to which wire 60 is connected. Thus, upon throwing the motor 8 out of operation, the lens tube shutter 11 of the machine having the motor 8 is allowed to close for cutting off the light in the lamp house 5. In a like manner, when the circuit of motor 8$^a$ is opened the circuit of solenoid 12$^a$ is simultaneously opened for permitting the lens tube shutter 11$^a$ to close, by reason of a link connection 64 between the controlling switch arm 43 of motor 8$^a$ and the adjacent switch arm 58.

A pair of armature levers 65 are pivoted intermediate their ends within the casing 25, and each armature lever 65 has one end connected to an extension 66 on the adjacent switch arm connecting link 64. Disposed beneath the free end of each armature lever 65 is an electromagnet 67, while disposed above the other end of each armature lever 65 is an electromagnet 68. The electromagnet 67, which is arranged to attract the armature lever 65, that is operatively connected to the controlling switch arm 43 of motor 8, has one side connected by means of a wire 69 to the wire 57 which connects one electromagnet 54 with the contact 19 of the magazine 6, the other side of this electromagnet 67 being connected by means of wire 70 with the conducting strip 31. In a like manner, the other electromagnet 67 is connected by means of wire 71 with wire 56 which is connected to contact 19 of magazine 6$^a$, the other side of the latter electromagnet 67 being also connected to the conducting strip 31 by means of a wire 70. It is thus apparent that when the contacts 19 and 20 of the magazine 6 are engaged by exhaustion of the film from the reel 15 of said magazine 6, the proper electromagnet 54 is energized for attracting the adjacent catch 51 and releasing the controlling switch arm 43 of the motor 8$^a$ which has the magazine 6$^a$, whereby the circuit of said motor 8$^a$ is closed, the proper electromagnet 67 being simultaneously energized for attracting its adjacent armature lever 65 and elevating the switch arm 43 controlling the motor 8 of the other machine, whereby the latter motor is rendered inoperative. In a like manner, when the contacts 19 and 20 are engaged in the film magazine 6$^a$ by reason of exhaustion of the film from the reel 15 therein, a circuit is closed which includes the other electromagnet 54 by means of which the adjacent catch 51 is attracted for releasing the controlling switch arm 43 of motor 8 so as to allow the latter switch arm to close the circuit of the latter motor, the other electromagnet 67 being simultaneously energized for attracting its cooperating armature lever 65 and elevating the controlling switch arm of motor 8$^a$ so as to break the circuit of the latter.

A pair of switches are mounted upon the exterior of the casing 25 and these switches are preferably of the push button type, one having a terminal thereof connected by wire 72 with one side of the electromagnet 68 disposed above the armature lever 65 which is connected with the controlling switch arm 43 of motor 8, and the other switch having one terminal connected by means of wire 73 with one side of the other electromagnet 68 which is associated with the armature lever 65 whose end is operatively connected with the controlling switch arm 43 of motor 8ª. These switches are respectively indicated at 74 and 75, and the former has its other terminal connected by wire 76 with the conducting strip 28, while the latter has its other terminal connected by means of wire 77 with said conducting strip 28. The other sides of the electromagnets 68 are connected by wires 78 to conducting strip 31. It will thus be seen that the motor 8 of one machine can be put out of operation whenever desired by actuation of the switch 74, while the operation of the motor 8ª of the other machine may be stopped at any desired time by actuation of switch 75.

A further pair of switches 79 and 80 are mounted upon the exterior of the casing 25, and each of the latter switches has one terminal thereof connected by wire 81 with the wire 27 or the conducting strip 28 as found most preferable. The other terminal of switch 79 is connected with the wire 56 by means of a wire 82, and the remaining terminal of switch 80 is connected by means of wire 83 with the wire 57. It will thus be apparent that the closing of switch 79 will affect release of the switch arm 43 which controls the motor 8 whereby the latter is placed into operation, and will simultaneously cause the elevation of the switch arm 43 which controls motor 8ª, whereby the latter motor is simultaneously thrown out of operation. In a like manner, actuation of switch 80 will affect release of switch arm 43 which controls motor 8ª, whereby the latter motor will be placed into operation, the switch arm 43 that controls motor 8 being simultaneously elevated for throwing said motor 8 out of operation. In this way the desired one of the two machines may be initially placed into operation even though both have full film reels in the magazines 6 and 6ª thereof.

In operation, the reels 15 with films completely wound thereon are placed in the upper film magazines 6 and 6ª of the two motion picture machines so that the contact arms 20 are both swung so as to be disengaged from both of their respective contacts 18 and 19. The switches 74 and 75 are then successively closed for energizing the electromagnet 68 and thereby affecting elevation of the motor controlling switch arms 43 whereby the circuits of the motors 8 and 8ª of the two motion picture machines are opened. It is of course to be understood that the switches 42 of both motor circuits have been previously opened and the switch 48 closed, while the respective films have been threaded through the feed mechanisms of the two machines to the lower film magazines thereof, in the usual manner. Assuming that it is desired to first place the machine in operation which has the actuating motor 8, the light in the lamp house 5 is then lighted, after which switch 79 is temporarily closed for energizing the proper electromagnet 54 for releasing the controlling switch arm 43 of motor 8 so that the circuit of the latter is closed. When the motor 8 is started, the proper switch arm 58 is also lowered to close the circuit of the solenoid 12 for causing the lens tube shutter 11 to open so that the projection of the picture will take place in the usual manner. Immediately prior to exhaustion of the film from the reel 15 in the upper magazine 6, the film contacting arm 22 in the magazine 6 will have lowered sufficiently to permit its cooperating contact arm 20 to engage the contact 18 associated therewith whereby a circuit is closed including the alarm 33 and battery 26 for warning the operator that the film is nearly exhausted from the reel in the magazine 6 and thereby advising him that the lamp in the lamp house 5ª should be lighted preparatory to operation of the machine having the actuating motor 8ª. Substantially as soon as the film is exhausted from the reel 15 of the magazine 6, the contact arm 20 associated with the film contacting arm 22 which is within the magazine 6, will engage the adjacent contact 19 for closing a circuit including one of the electromagnets 67 and one of the electromagnets 54 whereby the controlling switch arm 43 of motor 8 is elevated for breaking the circuit of the latter motor, and simultaneously releasing the controlling switch arm 43 of the motor 8ª by attracting its catch 51, so as to close the circuit of motor 8ª and place the machine having the latter motor into operation. When the motor 8 is thrown out of operation the circuit of the solenoid 12 is broken so as to permit the lens tube shutter 11 to close, while the circuit of the solenoid 12ª is simultaneously closed for elevating or opening the shutter 11ª of the lens tube 10ª provided on the lamp box 5ª of the machine having the motor 8ª which is now placed in operation. The projection of the film carried by the reel 15 in the magazine 6ª of the second machine is then effected, the starting of the projection of the pictures on the latter film taking place simultaneously with completion of the projection of the pictures on the film which was contained on the reel 15 within the magazine 6. Assuming that the show is to end upon completing the projection of the film contained by the reel 15 within the magazine 6ª, the apparatus may be completely thrown out of operation at the proper time or upon exhaustion of the film from the reel 15 of the magazine 6ª, by simply temporarily closing the switch 75 for causing the proper electromagnet 68 to be energized for elevating the switch arm 43 which controls the circuit of motor 8ª.

However, should the completion of the show require another operation of the machine having the motor 8 and the film magazine 6, upon completion of the operation of the machine having the motor 8ª and the film magazine 6ª, said machine having the motor 8 and film magazine 6 will be adjusted and a new reel substituted therein after the machine having the motor 8ª is placed into operation. Under these conditions, when the film is nearly exhausted from the reel 15 of the magazine 6ª, the arm 22 within said magazine 6ª will have lowered for causing its cooperating contact arm 20 to engage the adjacent contact 18 for closing a circuit including the source of electricity 26 and the alarm 33, whereupon the operator will light the lamp in the lamp house 5. Soon after this is done, the film is substantially exhausted from the reel 15 of magazine 6ª and the contact arm 20 which is associated with the arm 22 arranged within the magazine 6ª will engage the adjacent contact 19 for energizing the proper electromagnets 67 and 54 for affecting opening of the circuit of motor 8ª and the closing of the circuit of motor 8 by respectively elevating the switch arm 43 connected to wire 45 and attracting and releasing the catch 51 associated with the arm 43 to which wire 44 is attached. When this takes place the circuit of the solenoid 12ª is broken by elevation of the proper switch arm 58 so that the lens tube shutter 11ª is closed when the motor 8ª is thrown out of operation, and the circuit of the solenoid 12 will be simultaneously closed by lowering of the other switch arm 58 so that the lens tube shutter 11 will be opened at the same time and simultaneously with the starting of the motor 8. The projection of pictures of the second film which has been placed in the magazine 6 is thus effected. To throw the entire apparatus out of operation upon completion of the projecting operation of the machine having the motor 8, in case the show should be completed at that time, it is merely necessary to temporarily close switch 74. However, it is obvious that a change may be made from one machine to the other automatically as many times as desired by simply repeating the necessary preparation.

In an emergency the motion picture machines may be operated to the exclusion of the present invention by separately closing and opening the switches 42 at the proper time.

Obviously, the shutters 11 and 11ª may be arranged to close or lower by gravity so that springs are not necessarily required for elevating the cores of the solenoids 12 and 12ª. Also, minor changes may be made throughout the invention without departing from the spirit and scope of the invention as claimed, such as the substitution of a fiber roller for a soft rubber roller on the film contacting arms 22, the essential nature of this roller simply being to avoid scratching of the film or films. For safety purposes the switch 48 will be opened when the invention is not in use, while both of the switches 42 will be opened when neither machine is in use. It is also apparent that the switch 32 must be closed so as to place the invention in use, while proper insulation is utilized wherever necessary as clearly indicated in Figures 4 and 5.

From the foregoing description it is believed that the construction and operation as well as the advantages of the present invention will be readily understood and appreciated by those skilled in the art.

What I claim as new is:—

1. Motion picture apparatus including, in combination, a pair of motion picture machines with a motor for each, a dowser for each machine, a pair of switch elements adapted to be simultaneously closed for starting the motor of one machine and simultaneously opening the dowser thereof or to be simultaneously opened for stopping such motor and simultaneously closing said dowser, a second pair of switch elements adapted to be simultaneously closed for starting the motor of the other machine and simultaneously opening the dowser thereof or to be simultaneously opened for stopping the latter motor and simultaneously closing the latter dowser, film controlled means associated with said one machine for closing the second named switch elements and simultaneously opening the first named switch elements, and film controlled means associated with said other machine for opening the second named switch elements and simultaneously closing the first named switch elements.

2. Motion picture apparatus including, in combination, a pair of motion picture machines with a motor for each, a dowser for each machine, a pair of switch elements adapted to be simultaneously closed for starting the motor of one machine and simultaneously opening the dowser thereof or to be simultaneously opened for stopping such motor and simultaneously closing said dowser, a second pair of switch elements adapted to be simultaneously closed for starting the motor of the other machine and simultaneously opening the dowser thereof or to be simultaneously opened for stopping the latter motor and simultaneously closing the latter dowser, film controlled means associated with said one machine for closing the second named switch elements and simultaneously opening the first named switch elements, and film controlled means associated with said other machine for opening the second named switch elements and simultaneously closing the first named switch elements, said switch elements normally tending to automatically move to closed position, and means to releasably hold each pair of switch elements in open position, each film controlled means embodying electro-magnetic means to move one pair of switch elements to open position and to simultaneously release the holding means of the other pair of switch elements.

3. Motion picture apparatus including, in combination, a pair of motion picture machines with a motor for each, a dowser for each machine, a pair of switch elements adapted to be simultaneously closed for starting the motor of one machine and simultaneously opening the dowser thereof or to be simultaneously opened for stopping such motor and simultaneously closing said dowser, a second pair of switch elements adapted to be simultaneously closed for starting the motor of the other machine and simultaneously opening the dowser thereof or to be simultaneously opened for stopping the latter motor and simultaneously closing the latter dowser, film controlled means associated with said one machine for closing the second named switch elements and simultaneously opening the first named switch elements, and film controlled means associated with said other machine for opening the second named switch elements and simultaneously closing the first named switch elements, said switch elements normally tending to automatically move to closed position, means to releasably hold each pair of switch elements in open position, each film controlled means embodying electro-magnetic means to move one pair of switch elements to open position and to simultaneously release the holding means of the other pair of switch elements, and a film controlled switch for controlling each of said electro-magnetic means.

4. Motion picture apparatus including, in combination, a pair of motion picture machines with a motor for each, a dowser for each machine, a pair of switch elements adapted to be simultaneously closed for starting the motor of one machine and simultaneously opening the dowser thereof or to be simultaneously opened for stopping such motor and simultaneously closing said dowser, a second pair of switch elements adapted to be simultaneously closed for starting the motor of the other machine and simultaneously opening the dowser thereof or to be simultaneously opened for stopping the latter motor and simultaneously closing the latter dowser, film controlled means associated with said one machine for closing the second named switch elements and simultaneously opening the first named switch elements, and film controlled means associated with said other machine for opening the second named switch elements and simultaneously closing the first named switch elements, said switch elements normally tending to automatically move to closed position, means to releasably hold each pair of switch elements in open position, each film controlled means embodying electro-magnetic means to move one pair of switch elements to open position and to simultaneously release the holding means of the other pair of switch elements, and a film controlled switch for controlling each of said electro-magnetic means, electro-magnetic means for actuating the dowsers, said motors being included in circuits with one switch of each pair and a source of electricity of comparatively high voltage, and said electro-magnetic switch opening and releasing means and said dowser actuating means being included in circuits with a source of direct current of lower voltage.

In testimony whereof I affix my signature.

EARL M. LOEBER.